Figure 1:
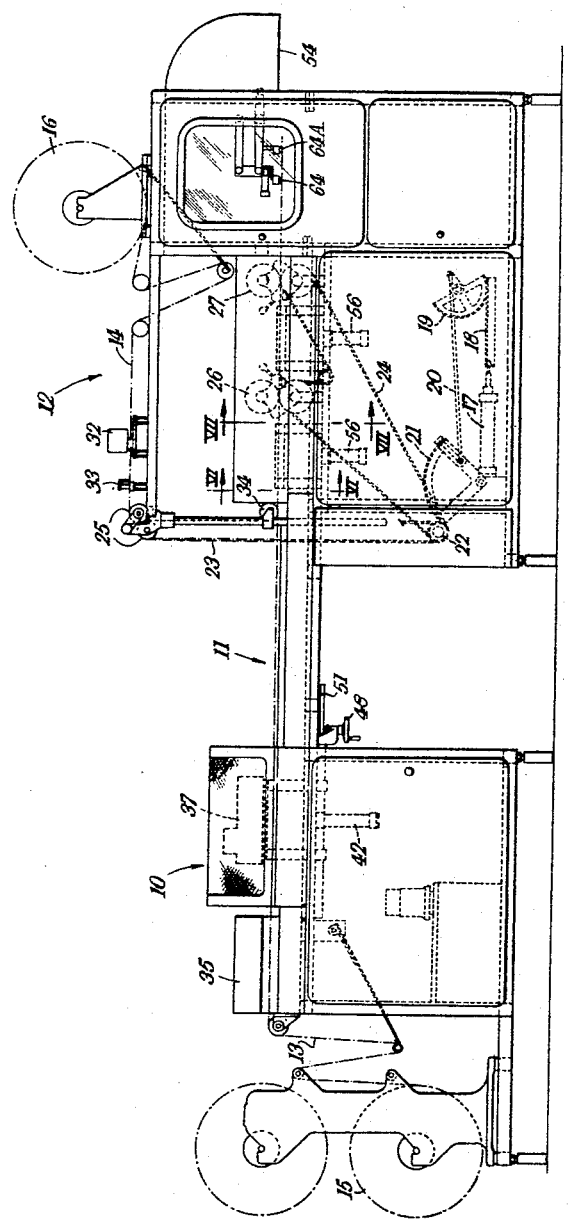

July 11, 1967  D. HILL  3,330,092
PACKAGING MACHINES
Filed March 18, 1964  5 Sheets-Sheet 1

INVENTOR
Denis Hill
By Watson, Cole, Grindle & Watson
ATTORNEYS

July 11, 1967 D. HILL 3,330,092
PACKAGING MACHINES

Filed March 18, 1964 5 Sheets-Sheet 3

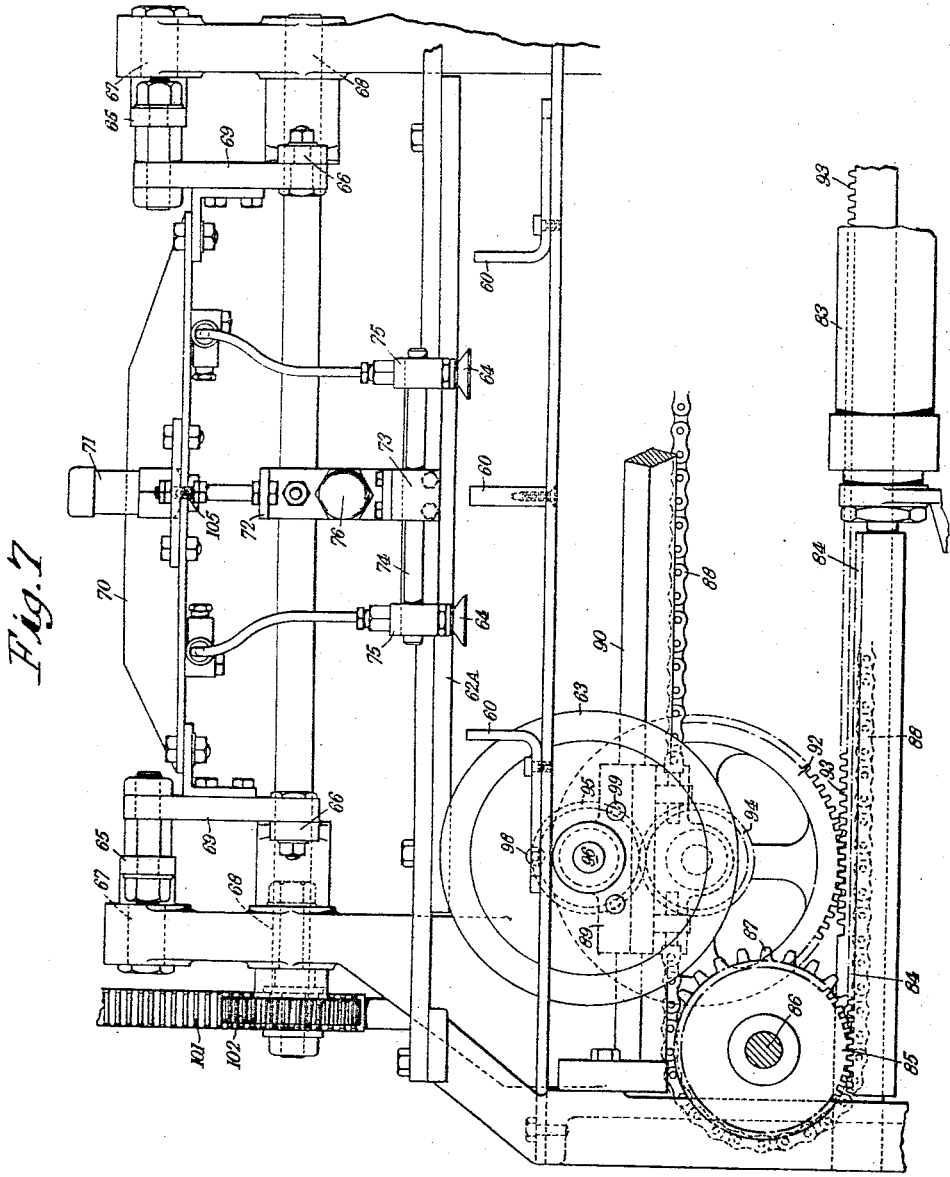

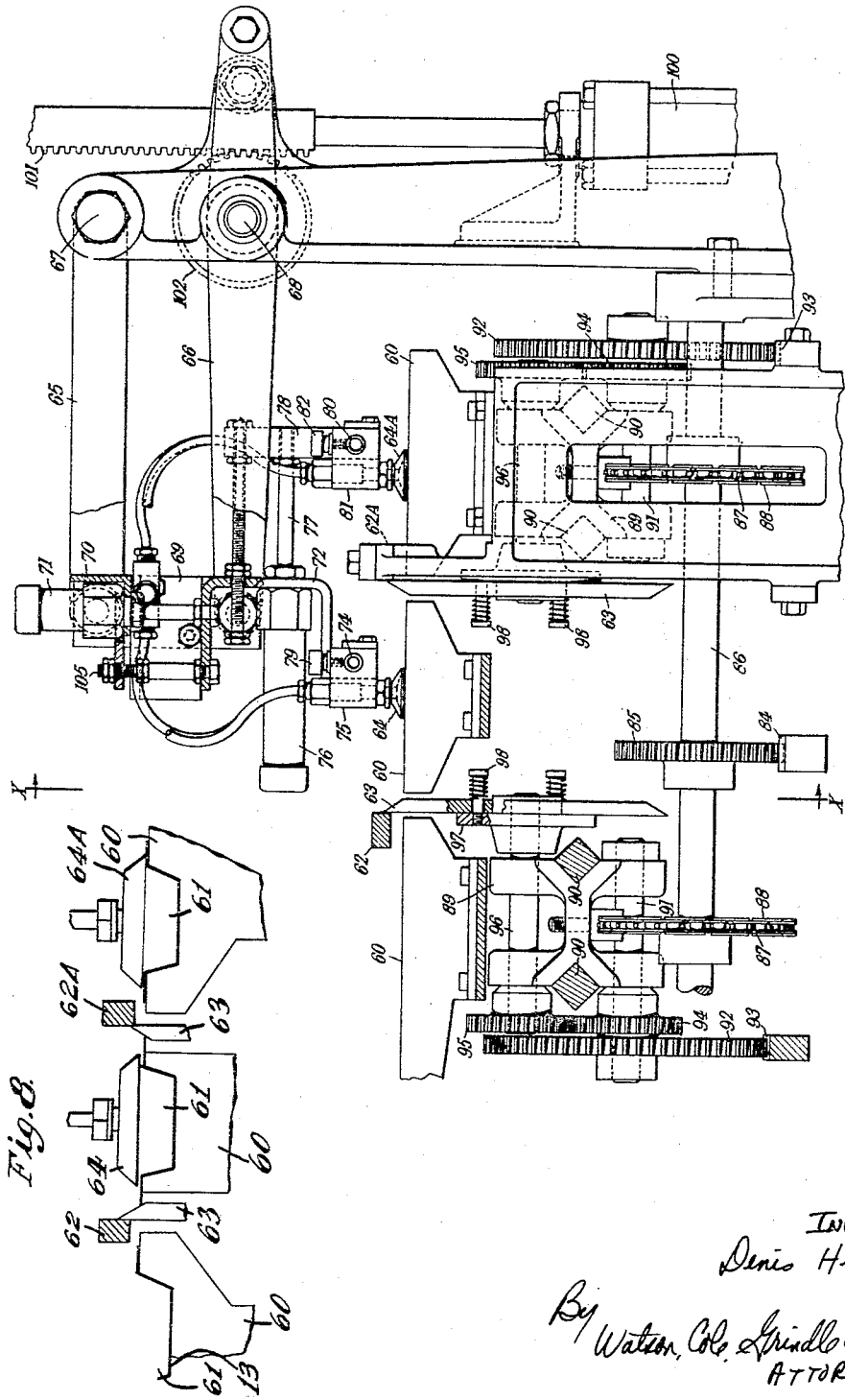

United States Patent Office 3,330,092
Patented July 11, 1967

3,330,092
PACKAGING MACHINES
Denis Hill, Farnley, Leeds, England, assignor to The Forgrove Machinery Company Limited, Leeds, England, a British company
Filed Mar. 18, 1964, Ser. No. 352,911
5 Claims. (Cl. 53—184)

This invention relates to blister packaging machines, that is to say packaging machines of the kind in which a bottom web of heat sealable thermoplastic material is fed past a moulding station at which downwardly projecting "blisters" are formed in the web, then past a filling station at which articles to be packed are placed in the downwardly depending pockets in the web formed by the blisters, then to a sealing station at which a top web of heat sealable material, which may either be a heat sealable thermoplastic web or a web of card or other suitable material having a heat sealable coating, is heat sealed to the bottom web around the perimeter of each blister and finally to a cutting station at which individual packages are cut from the superposed and united webs.

In such machines a problem arises in connection with the discharge of the packages from the machine because the packages tend to tilt when supported on a single row of blisters and cannot successfuly be pushed laterally to discharge them from the machine unless the blisters are large and have flat bottoms, which is frequently not the case. Moreover, when a group of blisters extending in columns and rows in relation to the bottom web is formed at each moulding operation and it is desired to subdivide the sealed webs into packages including a single blister only, difficulties arise if it is sought to sever the superposed webs transversely by a number of simultaneously operating transverse cutting knives, because then it will be necessary to move one or more rows of blisters along the path of feed of the web to clear the cutting knives before they can be discharged in a lateral direction.

The invention provides a blister packaging machine in which the webs of wrapping material are advanced intermitently through the machine, in which not more than two transversely extending rows of blisters (each of which can consist of one or more blisters) are formed in the bottom web at each moulding operation, in which the sealed webs are severed longitudinally between blisters, when there is more than one blister in a row, before they are severed transversely between the rows, and in which the mechanism for severing them transversely comprises a fixed transverse cutting knife (or two fixed transverse cutting knives if two rows of blisters are formed at a moulding operation), a corresponding number of movable transverse cutting knives, supporting rails for the webs situated beneath the fixed cutting knives, a group of suction cups which are operative, while the webs are dwelling at the transverse cutting station, first to press the webs against the supporting rails, then to lift them into contact with the fixed knives and finally, after the webs have been cut transversely by movement across them of the movable knives, to lift the severed packages away from the knives and deposit them at a discharge station.

When a single blister only, or several blisters in a transverse row, are formed at each moulding operation, one fixed and one movable knife only are required. When, however, two rows of blisters are formed at a moulding operation, the machine includes two fixed knives, spaced apart in the direction of feed of the webs, and two moving knives which operate simultaneously to sever from the web two packages, or two groups of packages when there are two or more blisters in a row.

In this case the suction cups engaging the leading group of packages are given, after transverse cutting, a forward movement, in the direction of feel of the webs, in order to bring the packages clear of the adjoining fixed transverse knife before they are lifted to deliver the packages to the discharge station.

As indicated later, the discharge mechanism according to the invention is also applicable to a blister packaging machine in which no top web is used and the moulded sections of the single web are trimmed after filling and then loaded by suction into cartons.

Figure 2:
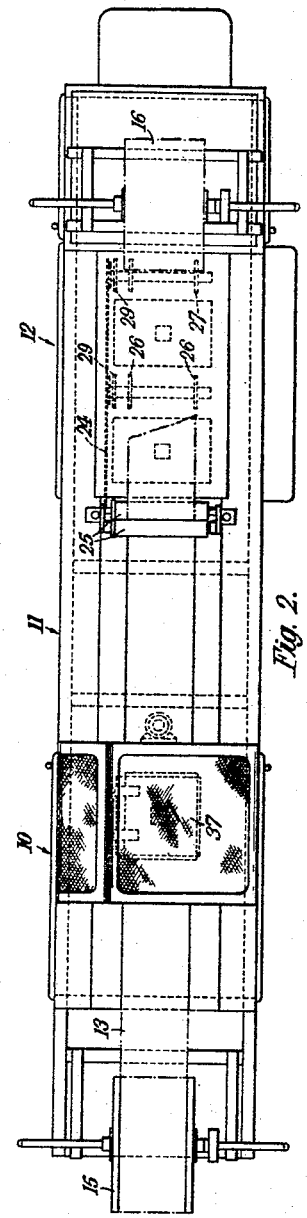
Figure 3:
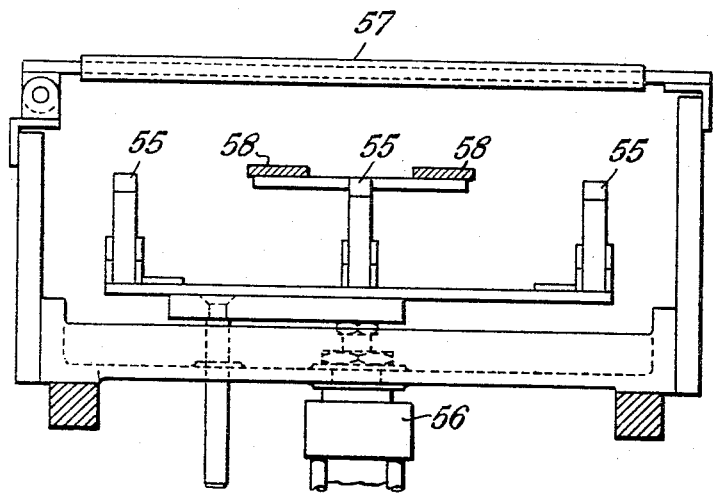
Figure 4:
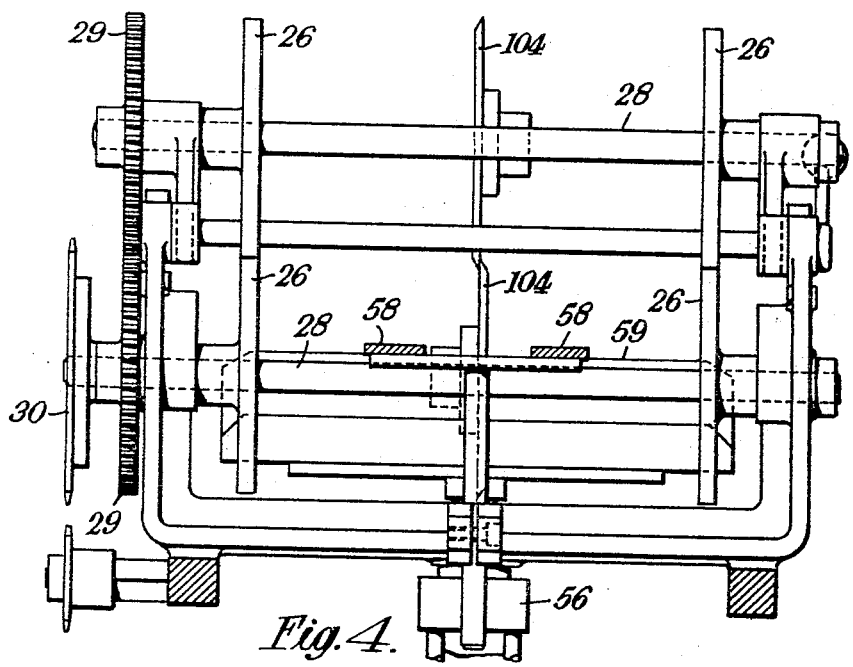

One embodiment of blister packaging machine in accordance with the invention will now be described in detail, by way of example, with reference to the accompany drawings, in which:

FIG. 1 is a side elevation of the machine,
FIG. 2 is a plan view,
FIG. 3 is a section on the line VI—VI in FIG. 5,
FIG. 4 is a section on the line VII—VII in FIG. 1,
FIGS. 5A–5D are diagrams showing successive stages in the operation of the transverse severing and discharge mechanisms,
FIG. 6 is a side elevation showing these mechanisms,
FIG. 7 is a section on the line X—X in FIG. 9, and
FIG. 8 shows an optional feature of the machine.

As indicated in FIGS. 1 and 2, the machine includes a moulding section 10, a filling section 11 and a sealing, severing and discharge section 12. The packages are formed from a bottom web 13 of heat sealable packaging material, in which the blisters are formed, and a top web 14 of similar packaging material. The web 13 is drawn from a real 15 and the web 14 from a reel 16. The web feed is effected by a pneumatic cylinder 17, the piston rod of which is connected to a rack 18, meshing with a toothed quadrant 19, connected by a link 20 to a toothed quadrant 21 meshing with a pinion 22. The pinion 22 drives, through a free wheel mechanism, a pair of chain sprockets which in turn drive chains 23, 24. The chain 23 drives a pair of feed rollers 25 for feeding the top web 14 and the chain 24 drives feed rollers 26, 27 which feed the two webs in superposition through the section 12 of the machine and therefore draw the web 13 from the wheel 15. An intermittent feed for the two webs is thus provided upon each working stroke of the cylinder 17.

The feed rollers 26 engage the webs in pairs near their edges, and their shafts 28 are geared together by gears 29 and receive the drive from the chain 24 through a sprocket 30. The feed rollers 27 are of similar construction, again engaging the web in pairs near their edges, their shafts being geared together and the drive being imparted to them by a sprocket. The shafts of the rollers 27 carry rotary knives 104 for slitting the superposed webs longitudinally.

The top web is guided over a roller 34 into superposition with the bottom web.

In the moulding section 10 the bottom web 13 first passes beneath a preheater 35 which warms the web before it reaches the moulding station. Here the web is clamped, as soon as it comes to rest, by application of suction to its side edges, beneath a water cooled platen above which is disposed a main heater 37. The suction is applied through suction holes in the platen. As soon as the web has been clamped, the web is exposed to heat from the heater 37. After the web has been sufficiently heated, a water-cooled mould, formed with cavities conforming to the shape of the blisters to be formed in the web, is then raised into contact with the undersurface of the web, suction being applied through the mould to draw the material into the cavities in the mould. The mould is then lowered again, and the suction applied through the holes to the edges of the web is released.

At the filling section 11 articles to be packaged are introduced into each group of blisters formed by the mould either manually or automatically.

In the sealing section the webs 13, 14 are sealed together both longitudinally and transversely, and individual packages are severed from the superposed webs, each package including one or more articles each enclosed in a blister in the bottom web, and the packages are discharged from the machine through a discharge outlet 54 (FIG. 1).

Sealing is effected in two stages, first longitudinal and then transverse, although the order of these operations may be reversed if desired. The longitudinal sealing is effected by three heater bars 55 (FIG. 3) which are situated in advance of the feed rollers 26 and are raised simultaneously by a pneumatic cylinder 56 to press the webs against a top plate 57. During longitudinal sealing the loaded blisters are supported by bars 58. The outer bars 55 seal the edges of the two webs together and the central bar 55 forms a longitudinal seal between the two columns of blisters. As soon as the bars 55 have contacted the webs, electrical heaters in the bars are switched on. After the heaters have been switched off the bars remain in contact with the webs for a sufficient time to allow the seals to be cooled, e.g. by cooling liquid passed through the bars. After the bars have descended the webs move on to the transverse sealing station, which is disposed between the two sets of feed rollers 26, 27. Identical sealing mechanism is provided at this second sealing station except that the heater bars 59 extend transversely between adjacent rows of blisters.

As the result of the two sealing operations the webs are sealed together not only at their edges but also longitudinally and transversely around each blister. The sealing bars are adjustable on their respective frames, the longitudinal bars transversely and the transverse bars longitudinally to suit changes in the pattern of blisters formed by the mould.

The superposed webs are slit longitudinally between the two columns of blisters by the knives 104, as already described, and from the second set of feed rollers 27 the longitudinally severed webs are fed to the transverse cutting and discharge mechanism which will now be described.

Figure 5A:
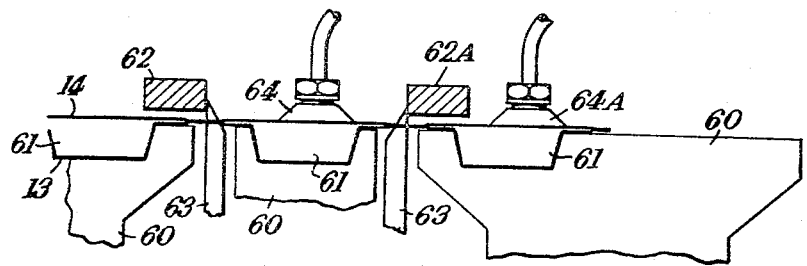
Figure 5B:
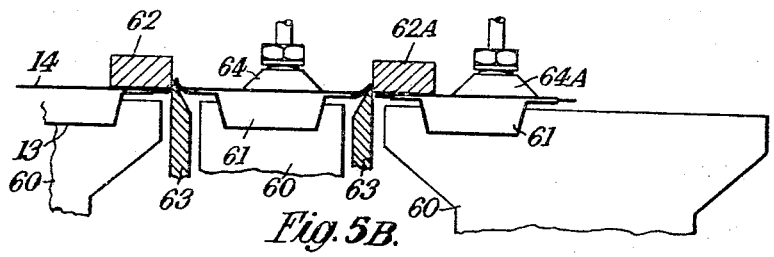

As illustrated in FIG. 5A, the superposed and longitudinally severed webs are fed on to supporting rails 60 which are spaced both longitudinally as shown and also transversely so as to provide spaces for the downwardly depending blisters 61. Above the rails 60 are a pair of fixed cutting knives 62, 62A with each of which is associated a rotary and transversely movable cutting knife 63.

Figure 5C:
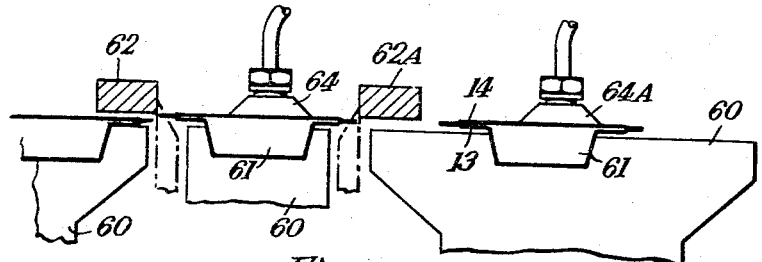
Figure 5D:
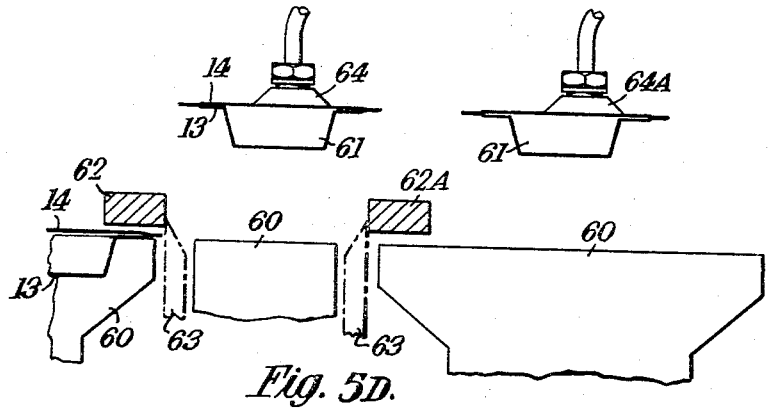

After the webs have come to rest, two pairs of suction cups 64, 64A are moved down to press the webs firmly against the rails 60. This ensures that the suction cups 64, 64A will securely grip the webs. The suction cups 64, 64A then lift to the position of FIG. 5B, in which the webs are flush with the undersurfaces of the fixed knives 62, 62A. The moving knives 63 then operate to sever the webs transversely. Then as indicated in FIG. 5C, the suction cups 64A are moved forwardly to bring the leading group of packages clear of the front fixed knife 62A. Finally, as shown in FIG. 5D all the suction cups are lifted in unison to deliver the packages to the discharge station.

As indicated in FIGS. 6 and 7 the four suction cups 64, 64A are supported by two pairs of parallel levers 65, 66 rotatable on pivots 67 and 68 and connected by links 69 and a cross member 70 which carries a pneumatic cylinder 71, the piston of which is attached to a member 72 carrying a block 73. A tube 74 passing through the block 73 carries blocks 75 on which the suction cups 64 are mounted. The blocks 75 and cups 64 can be moved along the tube 74 to positions to suit the width of the webs and located in position by screws 79.

The member 72 also carries a pneumatic cylinder 76, the piston rod 77 of which carries a block 78 supporting another tube 80 carrying blocks 81 supporting the other pair of suction cups 64A. The blocks 81 can be adjusted in position along the tube 80 and located in position by screws 82.

When the piston in the cylinder 71 moves down, the suction cups 64, 64A push the webs firmly against the rails 60. Suction is then applied to cause the cups to grip the webs and the cylinder 71 then operates to lift the webs into contact with the fixed knives 62. The upward movement of the suction cups is controlled by a screw 105.

An electrical or other signal is then transmitted to a pneumatic cylinder 83 causing its piston rod to move a rack 84, and rotate a pinion 85 on a shaft 86 carrying the driving sprockets 87 of a pair of chains 88, the other ends of which pass around idler sprockets (not shown). Each chain 87 carries a slide 89, which is accordingly moved along slide bars 90. Each slide 89 carries a shaft 91 on which is a pinion 92 engaging a fixed rack 93 and a gear 94 meshing with a gear 95 on a shaft 96 carrying one of the rotary knives 63. The cylinder 83 thus causes the knives 63 to move transversely of the webs and also to rotate. The direction of rotation is such that the webs are pushed upwardly against the fixed knives 62, 62A and the peripheral distance of travel of the knives 63 is the same as their linear distance of travel.

One of the knives 63 is shown in FIG. 7 mounted on a flange 97 by studs 98 carrying springs which maintain the knife 63 in contact with the fixed knife 62A. The other knife 63 is similarly mounted.

After the knives 63 have completed their cut, a signal is sent to the cylinder 76 which causes the piston rod 77 to move outwards and remove the front pair of severed packages from beneath the leading fixed knife 62A (see FIG. 5C). A signal is then passed to a pneumatic cylinder 100 which causes a rack 101 to rotate a pinion 102 in the direction to swing the levers 65, 66 through 180°, with the suction cups still facing downwardly, to bring the suction cups to the discharge position where the suction is released. The packages may be discharged down a chute or delivered directly by the suction cups into a carton or into pockets of a conveyor.

It will be seen that the suction cups serve not only to support the packages during transverse cutting but also serve to discharge the severed packages from the machine.

If a single blister, or only one row of blisters, is formed at each moulding operation the cylinder 76, suction blocks 81 and suction cups 64A will not be required and one transverse knife unit only will be needed.

The machine may readily be adjusted to suit different sizes and patterns of the assembly of blisters formed at each moulding operation. The mould is replaced by another, and the associated top platen is changed if a different area of exposure to the heat is required. The sealing bars are adjusted as already described, additional sets of longitudinal cutting knives can be provided if necessary, and the feed rollers are adjusted if necessary to provide a different rate of feed.

If desired, the top web and the sealing mechanism may be omitted. In this case the transverse knives cut the bottom web only and the suction cups are used to deliver packages with open topped blisters into a carton or the like. Each suction cup will in this case engage the web around the perimeter of the open topped blister therein as shown in FIG. 8. This figure corresponds with FIG. 5A except that whereas in FIG. 5A a top web is present, in FIG. 8 no such web is present.

What I claim as my invention and desire to secure by Letters Patent is:

1. A blister packaging machine, comprising means for advancing a web of packaging material intermittently through the machine, means for forming in the web, at consecutive moulding operations, not more than two transversely extending rows of blisters, each row consisting of at least one blister, means for severing the web transversely between the rows of blisters, after they have been filled with articles to be packaged, the transverse severing mechanism comprising a fixed transverse cutting knife for each row of blisters formed during a moulding operation, a movable transverse cutting knife associated with each fixed knife, means for operating said movable transverse cutting mechanism, supporting rails for the web beneath each fixed cutting knife or knives, a suction cup mechanism, means for operating said suction cup mechanism while the web is dwelling, first to press the web against the supporting rails, then to lift it into contact with the fixed cutting knife or knives, and finally, after transverse cutting has been completed, by movement across the web of the movable knife or knives, to lift the severed packages away from the knives and deposit them at a distcharge station, and means operative, when there is more than one blister in each row, to sever the web longitudinally between the blisters prior to transverse severance of the web.

2. A machine as claimed in claim 1, which includes means for feeding a second web of packaging material into position above the web containing the blisters and sealing the webs together longitudinally and transversely to enclose each blister preparatory to severance of the webs.

3. A machine as claimed in claim 1, in which blisters are formed in two transverse rows, and which includes means for advancing suction cups engaging the leading group of packages, after transverse severing and before the suction cups are lifted, to bring the packages clear of the adjoining fixed transverse knife.

4. A machine as claimed in claim 1, in which each movable transverse knife is mounted on a carriage which is movable transversely of the web and is geared to a pinion cooperating with a fixed rack.

5. A machine as claimed in claim 2, in which two rows of blisters are formed at each moulding operation and in which the suction cup mechanism includes two sets of suction cups supported on a parallel linkage, and a number of pneumatic cylinders which are operative in succession so as respectively to lower the cups into contact with the webs, to advance the front set of cups to bring the packages engaged by them clear of the leading fixed transverse knife and to actuate the linkage to raise the cups and discharge the packages.

References Cited
UNITED STATES PATENTS
2,958,168 11/1960 Vogt _____ 53—30
3,176,558 4/1965 Gustavson _____ 53—152 X TRAVIS S. McGEHEE, *Primary Examiner.*

FRANK E. BAILEY, *Examiner.*

N. ABRAMS, *Assistant Examiner.*